Jan. 8, 1957 B. GOLDBERG 2,777,055
AUTOMATIC FREQUENCY CONTROL SYSTEM WITH PHASE CONTROL FOR SYNCHRONOUS DETECTION
Filed Jan. 7, 1953
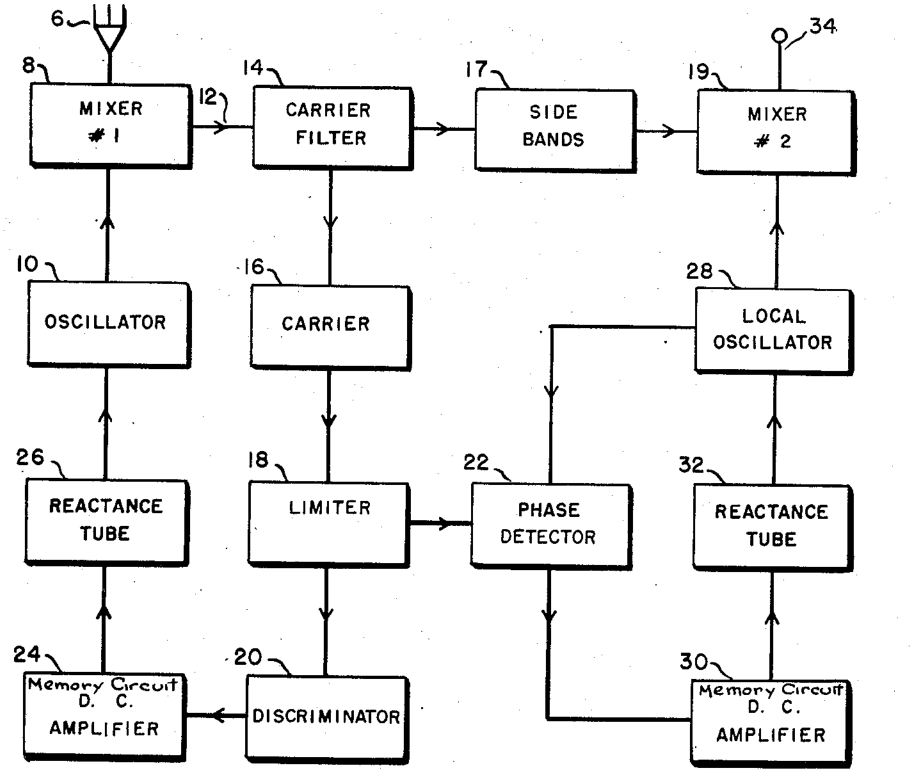
INVENTOR.
BERNARD GOLDBERG
BY
Harry M. Saragovitz
Attorney

United States Patent Office 2,777,055

Patented Jan. 8, 1957

2,777,055

AUTOMATIC FREQUENCY CONTROL SYSTEM WITH PHASE CONTROL FOR SYNCHRONOUS DETECTION

Bernard Goldberg, Wanamassa, N. J., assignor to the United States of America as represented by the Secretary of the Army

Application January 7, 1953, Serial No. 330,183

2 Claims. (Cl. 250—20)

(Granted under Title 35, U. S. Code (1952), sec. 266)

This invention may be used by or for the Government for governmental purposes without the payment of royalty thereon.

This invention relates to automatic frequency control systems and particularly to a system for combining a conventional automatic frequency control with a very precise system for reducing drift and frequency error to a negligible quantity.

This invention also relates to a detecting system wherein the detected signal is obtained by a beat note between modulated sidebands and a local oscillator.

Automatic frequency control systems are well known in the art and usually include discriminators for detecting the drift at intermediate frequencies. The drift signal controls an oscillator, usually by reactive means, to restore the mean intermediate frequency to substantially the frequency set on the discriminator. This system is very good for rough frequency control, within a few cycles, but it cannot be made sensitive enough to automatically control the frequency to within less than a cycle as would be desired in precise work.

The subject invention is a novel automatic frequency control to be used in conjunction with a conventional frequency control. The novel automatic frequency control consists of a local oscillator precisely synchronized with the carrier frequency of the incoming signal which has been previously adjusted to approximately the oscillator frequency. The synchronized oscillator is then combined with the sidebands of the modulated incoming signal to produce beat notes as a means of detecting the modulation information.

It is therefore an object of this invention to provide an automatic frequency control circuit.

It is a further object of this invention to provide a precision automatic frequency control to use in conjunction with a standard automatic frequency control.

It is a further object of this invention to provide a system for controlling frequency, for beat frequency detection purposes, to within a few degrees of a cycle or less.

Other objects of this invention will become apparent from the following specification and the drawing which shows a frequency control system in block diagram form according to this invention.

Referring now in particular to the drawing, a signal is received through antenna 6 and fed into the first mixer 8 where it is combined with a signal from oscillator 10 to produce an intermediate frequency beat note which is carried through 12 to the carrier frequency filter 14. The carrier filter removes the sidebands or the modulation components which are passed on through 17 to the second mixer 19. The carrier frequency is separated from the sidebands of the original intermediate frequency 12 by the carrier filter 14 which should have an extremely narrow band pass. The carrier frequency may be amplified in 16 and may be limited as in 18 to be passed on to the discriminator 20 of the rough automatic frequency control loop and to the phase detector 22 of the precise automatic frequency control.

Considering first the rough automatic frequency control loop which operates in a more or less conventional fashion, the filtered intermediate carrier frequency is applied to the discriminator 20 to produce an error voltage which may be amplified in a direct current amplifier 24 to control the reactance tube 26 to vary the oscillator 10 by an amount approximately enough to change the intermediate frequency at 12 to bring it to the desired intermediate frequency value as determined by the discriminator setting. Mechanical or other means well known in the art of varying the oscillator frequency, or controlling the radio frequency tuned circuits, not shown in the diagram, that may be actuated by an error signal are also applicable.

Referring now to the second automatic frequency control loop, a means is desired to provide a very precise signal to mix with the incoming signal and provide detection with as small an error as possible. In this case the detection is by beating a local oscillator against the sideband of the incoming modulated signal at intermediate frequency level. Detecting systems of this type are known but except in the case of a synchrodyne which does not filter out the sidebands, no attempt has been made to obtain an absolute synchronism between the local oscillator and the incoming signal. In this invention a local oscillator is precisely synchronized with the incoming carrier frequency as found at the limiter 18. The synchronizing is accomplished by means of the phase detector 22 supplemented by the direct current amplifier 30 and the reactance tube 32. This sort of system is known to some extent in the art as a coherent oscillator, synchronized detector, or phase locked oscillator.

The phase detector itself which also may be known as a phase discriminator, utilizes a push-pull signal from the oscillator. A signal 90° out of phase with the opposing oscillator signals is added to each of the oscillator signal components. The resultants are added and the net voltage is zero at the equilibrium point. However as the phase of the carrier frequency changes with respect to the oscillator frequency the resultant of the addition of one phase of the oscillator and the carrier frequency and the addition of the other phase of the oscillator and the carrier frequency will produce an unbalance. This unbalance indicates the direction of error and is in the form of a voltage which may be amplified in the direct current amplifier 30 to actuate the reactance tube 32 which is coupled to and controls the local oscillator 28 to bring it back to phase synchronism.

This oscillator synchronizing circuit is very highly sensitive and will control the oscillator frequency and phase to within a degree of a cycle or less of the appropriate carrier frequency. The circuit will synchronize if the local oscillator is initially a few cycles off the incoming carrier frequency since the difference in frequency will pass through the phase detector as a low frequency alternating voltage which is amplified and actuates the reactance tube to shift the local oscillator until it is brought back to the incoming carrier frequency whereat it crosses the zero point of the phase detector and, figuratively, locks in. However, due to its extreme sensitivity the circuit may not synchronize over a very wide range. Therefore, it is desirable to have a conventional automatic frequency control, or some other means of confining the incoming frequency to relatively narrow limits, to insure operation of the precision automatic frequency control circuit.

Along with the direct current amplifiers that transmit the error voltage in both automatic frequency control loops to adjust the corresponding oscillator frequency, it may be desirable to incorporate memory circuits to maintain the error voltage during temporary loss of the carrier frequency. This will avoid a tendency of the oscillators, when in a corrected state, to drift back to normal before the carrier frequency becomes usable again.

The local oscillator signal which is precisely the frequency of the original carried 16 is mixed with the sidebands of the modulated incoming signal in mixer number 2 to detect the original modulation component which may be taken from the output 34. The resultant output will be a very highly stable and accurate reproduction of the original modulation because of the extremely accurate beat note detection provided.

The absence of the carrier frequency from the sideband component in 17 before applying to the second mixer improves the output considerably by avoiding possible cancellation, phase distortion, or other interference between the carrier frequency and the local oscillator.

This system is more reliable than systems depending on the receipt of a carrier component to the incoming signal to supply a mixing signal since the carrier signal may be delayed, distorted, or temporarily lost due to transmission through the atmosphere. The local oscillator, in this invention, continues at the last received frequency for a substantial length of time and always at constant amplitude until readjusted in frequency or phase by the revival or strengthening of the carrier frequency component of the incoming signal. The sideband information which may not have been lost along with the carrier encounters the oscillator signal of the last carrier frequency and is still preserved.

Having thus described the invention, what is claimed is:

1. Means for detecting the modulation components of an incoming signal having carrier frequency and side bands comprising; a first oscillator, a first mixer coupled to said oscillator producing an intermediate carrier frequency and intermediate side band frequencies, an intermediate carrier frequency filter coupled to said mixer, a first means coupled to said filter for amplifying and limiting said intermediate carrier frequency, a discriminator connected to said intermediate carrier frequency filter, a reactance tube actuated by said discriminator output, said reactance tube controlling said first oscillator to maintain said intermediate carrier frequency substantially constant, a second oscillator, a phase detector, said first means and said second oscillator coupled to said phase detector, a reactance tube actuated by said phase detector, said reactance tube controlling said second oscillator to synchronize it with said intermediate carrier frequency, a second means for amplifying said intermediate frequency side bands, a second mixer coupling said second means for said second oscillator frequency to reproduce said modulation components.

2. Means for detecting the modulation components of an incoming signal having a carrier frequency and side bands comprising; a first oscillator, a first mixer connected to said oscillator producing an intermediate carrier frequency and intermediate side band frequencies, an intermediate carrier frequency filter, a first means for amplifying said intermediate carrier frequency connected to said filter, a second means for limiting said intermediate carrier frequency connected to said first means, a discriminator tuned to said intermediate carrier frequency connected to said second means, a direct current amplifier and memory circuit for retained said discriminator output connected to said discriminator, a reactance tube actuated by said memory circuit output, said reactance tube controlling said first oscillator to maintain said intermediate carrier frequency substantially constant, a second oscillator, a phase detector, said second means and said second oscillator coupled to said phase detector, a direct current amplifier and memory circuit connected to said phase detector for retaining its information, a reactance tube actuated by said memory circuit, said second oscillator controlled by said reactance tube and synchronized with said intermediate carrier frequency, a third means for amplifying said intermediate side bands connected to said first mixer, a second mixer connected to said third means and said second oscillator to produce said modulation component.

References Cited in the file of this patent

UNITED STATES PATENTS

| | | |
|---|---|---|
| 2,066,528 | Harper | Jan. 5, 1937 |
| 2,270,023 | Ramsay et al. | Jan. 13, 1942 |
| 2,407,863 | Ziegler | Sept. 17, 1946 |
| 2,530,614 | Hugenholtz | Nov. 21, 1950 |
| 2,544,311 | Gottier | Mar. 6, 1951 |
| 2,575,047 | Crosby | Nov. 13, 1951 |
| 2,662,181 | Hugenholtz | Dec. 8, 1953 |
| 2,691,726 | Leypold | Oct. 12, 1954 |

OTHER REFERENCES

Article: "A Single Sideband Selector For Ham Use," by Najork, Radio News, August 1948, pp. 53, 54, 55, 120, 122, and 123.